Patented Jan. 8, 1946

2,392,378

UNITED STATES PATENT OFFICE 2,392,378

COPOLYMERS OF CHLOROTRIFLUORO-ETHYLENE AND OLEFIN HYDROCARBONS

William Edward Hanford, Easton, Pa., assignor to E. I. du Pont de Nemours & Company, Wilmington, Del., a corporation of Delaware No Drawing. Application October 25, 1943, Serial No. 507,602

6 Claims. (Cl. 260—80)

This invention relates to polymeric materials and more particularly to polymers obtained from chlorotrifluoroethylene and olefinic hydrocarbons.

This invention has as an object the production of new and useful compositions of matter. A further object is the preparation of valuable high molecular weight polymers comprising chlorotrifluoroethylene and olefinic hydrocarbons. A still further object resides in the preparation of chlorotrifluoroethylene/ethylene copolymers. Other objects will be apparent from the following description of the invention.

These objects are accomplished by the following invention which comprises polymerizing a mixture of chlorotrifluoroethylene and a polymerizable olefinic hydrocarbon as more fully described hereinafter.

The preferred embodiments of the invention are illustrated by the following examples in which the proportions of reactants are given in parts by weight unless otherwise indicated.

Example I

A stainless steel high pressure reactor is swept with nitrogen and charged with 25 parts of deoxygenated water and 0.1 part of benzoyl peroxide. It is then closed, evacuated, and further charged with 40 parts of chlorotrifluoroethylene and 10 parts of ethylene. The reactor is agitated and heated to 80° C. for 9 hours, during which time the internal pressure falls from 70 to about 60 atmospheres. The reactor is then cooled, the pressure released, and the product is discharged as a white powder. The polymer, when washed and dried, amounts to 7 parts and is found to contain 24.04% chlorine and 40.1% fluorine, which corresponds to a chlorotrifluoroethylene/ethylene copolymer containing 80% chlorotrifluoroethylene by weight or a mole ratio of chlorotrifluoroethylene to ethylene of 1.1:1. A film of this copolymer sticks to a copper block when heated under a pressure of about 0.1 kg./sq. cm. at about 175° to 180° C. as compared with about 145° to 160° C. for chlorotrifluoroethylene polymer and 80° to 100° C. for polyethylene. The copolymer can be pressed at 190° to 200° C. to obtain films which are tough and which can be cold drawn to an elongation of 300%. The oriented films obtained by cold drawing retract only about 10% when heated to 100° C. When they are heated under tension to maintain constant length, the temperature at which they pull apart by virtue of their own force of retraction is 190° C.

Example II

A high pressure reactor is swept with oxygen-free nitrogen and charged with 100 parts of deoxygenated distilled water and 0.2 part of benzoyl peroxide, and the pH is adjusted to about 3.5 with formic acid. It is then closed and evacuated to remove the nitrogen and 20 parts of chlorotrifluoroethylene is admitted. Ethylene is then admitted to produce a pressure of 700 atmospheres at a reaction temperature of 80° C. which is maintained for 12 hours. The pressure falls as the reaction proceeds, and after 12 hours it has become stabilized at 430 atmospheres, indicating the completion of the reaction. The reactor is cooled, the pressure released and a solid chlorotrifluoroethylene/ethylene copolymer is discharged. After drying, the copolymer amounts to 44 parts and is found to contain 19.14% fluorine and 11.82% chlorine which corresponds to a mole ratio of chlorotrifluoroethylene to ethylene of 1:6.55. This copolymer can be pressed or solvent cast into pliable tough films having tensile strengths of about 2700 lbs./sq. in. The films are capable of being cold drawn to an elongation in excess of 400% and have good tear strengths.

Although the invention is illustrated by the polymerization of chlorotrifluoroethylene and ethylene it is applicable to olefinic hydrocarbons containing up to five carbon atoms. Examples of other olefinic hydrocarbons are propylene, butylene, isobutylene and the amylenes. A particularly valuable embodiment of this invention resides in the production of the chlorotrifluoroethylene/ethylene copolymer and particularly the copolymer containing a mole ratio of 1:1 of chlorotrifluoroethylene and ethylene. This copolymer has a softening temperature which is higher than that of copolymers containing greater or lesser amounts of ethylene, and further, the equimolecular mixture of monomers is polymerized with greater ease, that is, at lower pressures than is either monomer alone. Useful products are obtained, however, with mixtures containing both constituents in substantial amount, as for example with mixtures containing from 5% to 95%, based on the total weight of the two ingredients, of the olefin hydrocarbon.

Although the examples illustrate the polymerization of the monomers in the presence of water, it is possible to carry out the reaction in the absence of any diluent. The reaction can also be carried out in the presence of organic solvents instead of or in addition to water.

The catalysts used in the practice of this invention are peroxy compounds, that is, those compounds which contain a —O—O— linkage. Examples of these compounds are diacyl peroxides, such as benzoyl peroxide, soluble salts of persulfuric acid, such as ammonium and potassium persulfate, dialkyl peroxides, such as diethyl peroxide, and alkyl hydroperoxides, such as tertiary butyl hydroperoxide.

The process of this invention is generally conducted at temperatures within the range of 40° to 200° C. The reaction is preferably carried out in the range of 60°–150° C. depending upon the catalysts used. Thus, with diacyl peroxides, temperatures ranging from 60°–120° C.; with persulfate catalysts, 60°–100° C.; and with dialkyl peroxides temperatures of 100°–150° C. are generally used.

The pressures used will depend not only on the nature of the olefinic hydrocarbon to be copolymerized with chlorotrifluoroethylene, but also upon the molecular weight which is desired in the product. For example, a copolymer containing a mole ratio of chlorotrifluoroethylene and ethylene of 1:1 can be obtained at pressures as low as 50 atmospheres, whereas in order to produce copolymers containing higher proportions of ethylene, it is generally preferable to operate at pressures at least as high as 200 atmospheres and preferably in the neighborhood of 800 to 1000 atmospheres. Higher molecular weight polymers are generally obtained when the polymerization is carried out under higher pressures.

The products of this invention are adapted to a variety of uses. They may be used in molding plastics, films, foils, fibers, and adhesives, and in the coating of wire for purposes of electrical insulation. For many of these purposes the polymer may be combined with or prepared in the presence of plasticizers, stabilizers, fillers, pigments, dyes, softeners, natural resins or other synthetic resins.

As many apparently widely different embodiments of this invention may be made without departing from the spirit and scope thereof, it is to be understood that I do not limit myself to the specific embodiments thereof except as defined in the appended claims.

I claim:

1. A process for making polymers which comprises heating to polymerizing temperature a mixture of chlorotrifluoroethylene and an olefin hydrocarbon having not more than five carbon atoms in contact with a peroxy compound as a catalyst.

2. A process for making polymers which comprises heating to polymerizing temperature a mixture of chlorotrifluoroethylene and ethylene in contact with a peroxy compound as a catalyst.

3. A process for making polymers which comprises heating to polymerizing temperature a mixture, in a 1:1 molar ratio, of chlorotrifluoroethylene and ethylene in contact with a peroxy compound as a catalyst.

4. The copolymerization product of chlorotrifluoroethylene and an olefin hydrocarbon having not more than five carbon atoms.

5. The copolymerization product of chlorotrifluoroethylene and ethylene.

6. The copolymerization product in a 1:1 molar ratio of chlorotrifluoroethylene and ethylene.

WILLIAM EDWARD HANFORD.